United States Patent Office 3,749,646
Patented July 31, 1973

3,749,646
METHOD AND APPARATUS FOR CONTINUOUS ADDITION OF A COMPONENT TO A REACTION SYSTEM
Stanley J. Pirt, London, England, assignor to National Research Development Corporation, London, England
Filed May 14, 1970, Ser. No. 37,285
Claims priority, application Great Britain, May 14, 1969, 24,688/69
Int. Cl. C12b 1/00
U.S. Cl. 195—117                                4 Claims

ABSTRACT OF THE DISCLOSURE

The invention relates to a method of continuous addition of a required component to a liquid chemical or biological system whereby the added component is diffused into the system during the chemical reaction or biological process from a sealed container immersed in the system. A particularly suitable container for use with the method is also described. The method can provide substantially constant rates of addition over relatively long periods.

---

The present invention relates to the continuous addition of a compound to a chemical or biological system.

In a chemical or biological process, it is often advantageous to control or retard the addition of a component of the system. Thus, for example, the rate of chemical reaction or biological fermentation or growth, or the nature of the product obtained, may be adjusted by control of the rate of addition of a reactant or nutrient to the system. Thus, for example, in some microbiological culture systems, a high concentration of one nutrient may inhibit growth or fermentation and yet a substantial quantity of the nutrient may be required and can only be fed in during the process.

Hitherto continuous addition of components to reactive systems has been achieved by means such as pumps, constant head devices, drip feeds, and the like.

Diffusion feed techniques have been used for adding nutrient to microbiological systems but these have involved the use of tubing or of relatively large reservoirs of nutrient solution, often involving the use of elaborate apparatus.

For many purposes, particularly "shake-flask" culture of bacteria, fungi, viruses and the like, means such as these are frequently cumbersome and expensive especially where a large number of small vessels are used in a relatively small space, for example an incubator. Furthermore at the lowest practicable rates of addition non-diffusion feed means tend to provide addition rates that fluctuate excessively, whereas in most cases, a constant feed rate is desirable. Drip feeds, particularly at low rates of addition, cannot properly be considered to provide a continuous addition.

According to the present invention there is provided a method of continuous addition of a required component to a liquid chemical or biological system, whereby the added component is diffused into the system during the chemical reaction or biological process from a sealed container immersed in the system.

The method according to the invention enables the required component to be added at a controlled rate and thus can often be used to control the overall rate of the chemical reaction or biological process.

The method according to the invention is particularly advantageous in microbiological systems, especially in shake flask culture of microorganisms such as viruses, mammalian cell-lines, bacteria or fungi. Components which may be added by the diffusion method include, for example, carbon sources such as sugars, e.g. glucose or lactose, nitrogen sources such as ammonium salts or amino acids, and vitamins, growth factors and essential trace elements. Where a gas such as oxygen or carbon dioxide can advantageously be supplied in relatively small quantities over a prolonged period this too can be introduced by diffusion through a membrane or partition, if necessary under pressure, whereby the rate of addition can be controlled.

In certain microbiological systems, an additive may be metabolised by the organism if present at a low concentration in the medium but if present at higher concentrations becomes toxic to the organism. For example the production of griseofulvin in optimum yield requires a carefully regulated concentration of nitrogen. Also substrates used in biological conversions, such as steroids or hydrocarbons, are often toxic in other than low concentrations, an example being the conversion of α-pinene into other terpenes using *Aspergillus niger*. In these cases the method according to the invention provides an especially advantageous means of control.

A further advantageous use of one method according to the present invention is in the supply of a pulse of radioactive tracer substrate to a culture; the tracer can be diffused in at a rate equal to the uptake rate and any excess of tracer can be simply removed in the capsule. This method eliminates more elaborate procedures for recovery of valuable or dangerous radioactive material.

It has also been observed when using the method according to the present invention that very low constant rates of addition of a growth limiting substrate, for example sugar, to bacterial cultures can induce synchronous division of the cells. This novel metabolic effect offers interesting experimental possibilities.

In chemical reactions, the diffusion method according to the invention is particularly advantageous in any process where slow addition of one reactant is required in order to reduce to a minimum secondary reaction of that reactant with the desired product.

The sealed container used in the method according to the present invention is conveniently a sachet or capsule, at least in part formed of diffusion membrane. The membrane used in the method according to the present invention for diffusing the component into the system will be dependent upon the nature of the added component and of the system.

In biological or chemical systems comprising aqueous solutions or suspensions the use of dialysis or other diffusion membrane is convenient. Where the system requires it, however, diffusion membranes or diffusion partitions resistant to corrosion or decomposition may be used as, for example, in reactions involving caustic alkalis, strong acids and the like. Dialysis membranes for use in biological and biochemical systems include viscose cellulose films, for example those obtainable from the Visking Corporation, colloidion, etc.

The rate of diffusion may be varied by alteration of the dimensions of the diffusion membrane. Thus, the rate will be proportional to the area of the membrane or partition used and inversely proportional to its thickness.

It has been found, for example, in aqueous biological systems that the rate of diffusion from a sealed container appears to be related to the difference between the concentrations of the substance initially present in the container and the substance present in the surrounding medium rather than the difference between the concentrations on either side of the membrane at any intermediate time. Thus virtually constant rates of diffusion can be obtained over long periods of addition, for example over periods of about 12 hours. The rates of diffusion obtained are particularly constant when using polar substances such as amino acids or especially sugars.

This finding of a substantially constant diffusion rate is especially marked when the area of the diffusion membrane is small in relation to the volume of the sealed container, for example when using as sealed container a cylinder of impermeable material provided with a relatively small diffusion membrane in a cap at one end, the container being sufficiently resilient to expand slightly thereby allowing solvents to enter the container by osmosis until the pressure in the container is opposed to the elastic tension in the container walls. In general the container should be capable of withstanding internal pressure up to about 100 kg./cm.$^2$.

An advantage of the method is that the added component solution inside the sealed container may be relatively concentrated compared with the system to which addition is being made. Thus containers of a relatively small volume may be used which fit easily inside a shake flask or the like. In addition, th movement of the container within the system aids even distribution of the added component.

For industrial use unit capsules, each containing a metered amount of additive such as glucose, are particularly useful.

According to a further feature of the present invention there is provided a container for use in the method according to the invention, including a substantially impermeable capsule provided with an aperture and removable sealing means for sealing said aperture with at least one diffusion membrane.

In a preferred embodiment, the capsule is in the form of a hollow cylinder with at least one opened end and the sealing means include an annular cap and at least one disc of diffusion membrane, whereby in use the membrane disc or discs are held in position on the open end of the cylinder by the annular cap. A resilient washer is preferably provided on the capsule or on the cap to ensure a tight seal between the diffusion membrane and the capsule.

The annular cap is advantageously threaded for screw engagement with the cylinder, but other fixing means are also effective.

The rate of diffusion, when using the container according to the invention, may be adjusted by choosing varying thicknesses of membrane or alternatively by sealing the container with varying numbers of layers of membrane.

Particular embodiments of the container according to the invention will now be described in detail by way of illustration only, with reference to the accompanying drawings, in which.

Figure 1:
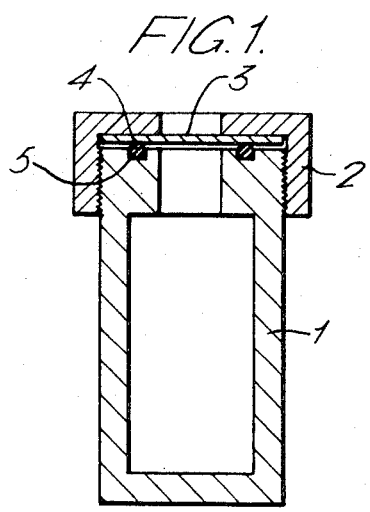
FIG. 1 shows a sectional view of one embodiment of the container with the cap in place.

Referring to FIG. 1, the container consists of a hollow cylinder 1 formed of an impermeable material the cylinder 1 having one open end, a hollow cylindrical cap 2 formed of the same material, the cap having one open end and one end apertured to permit exposure of a disc 3 of membrane to the chemical or biological system, and an O-ring 4 adapted to fit in an annular groove 5 in the open end of the cylinder. The cap 2 is tapped to screw onto a thread cut on the outer surface of the cylinder 1. The O-ring 4 is held in the groove by means of an epoxy resin adhesive.

In use, the additive is placed in the cylinder 1, the required number of membrane discs 3 are placed over the open end and the cap 2 is screwed down, sealing the membrane disc or discs 3 across the aperture. The whole capsule or just the membrane is then immersed in the reacting system.

Figure 2:
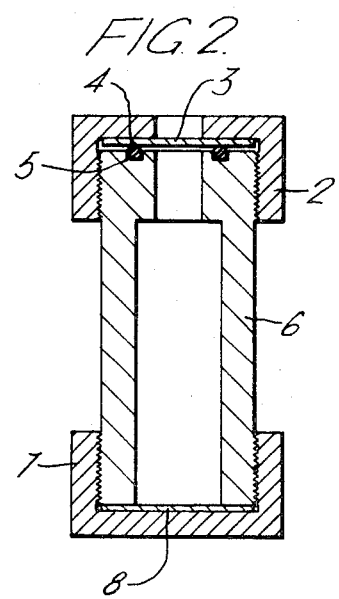
FIG. 2 shows a sectional view of a second embodiment of the container with the cap in place.
Figure 3:
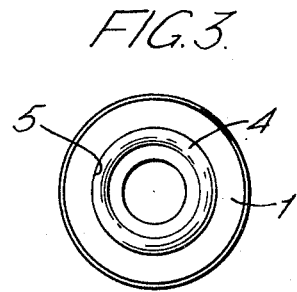
FIG. 3 shows an end elevation of the first embodiment without the cap.

In an alternative embodiment, illustrated in FIG. 2, a cylinder 6 is formed with two open ends, one being sealable with the annular cap 2 and membrane disc or discs 3 as described above, the other adapted to be sealed by screw engagement of an impermeable cap 7 arranged to seat on a resilient gasket 8. This embodiment possess the advantages of ease of cleaning and simplicity of manufacture. The impermeable cap 7 can optionally be replaced by a further annular cap 2 and disc or discs 3 of membrane.

The following examples show use of the container according to the invention in the employment of the method according to the invention.

EXAMPLE 1

Glucose feed

A container as shown in FIG. 1 was provided with an exposed membrane of 7.5 mm. diameter, and 0.051 mm. dry thickness cut from cellulose dialysis tubing was completely filled with a solution of glucose (about 1.2 ml.; concentration 50 g./100 ml.) and sealed with a single membrane in the cap. The capsule was autoclaved at 15 p.s.i. (120° C.) for 15 min., then immersed in a culture of the bacteria *Escherichia coli*. The volume of the culture (60 ml.) was contained in a 250 ml. conical flask which was agitated on a rotary shaker at 200 r.p.m. (throw 1 in.). The bacteria utilized the glucose as fast as it diffused out of the capsule so that the glucose feed rate was the factor which limited the growth rate of the culture; the concentration of glucose in the medium was effectively zero. The glucose diffused out of the capsule at a rate of 110 mg./hr. for over 3 hr. with the single membrane. With a double thickness of membrane the rate of efflux was 52 mg./hr. for over 6 hr., thus the bacterial density in the culture increased at a constant rate about one-half that with a single membrane.

EXAMPLE 2

Lactose feed

An experiment similar to that of Example 1 was performed but with lactose (30 g./100 ml.) in the capsule in place of glucose. Again the effective concentration of the sugar outside the membrane was zero. With one membrane the rate of efflux was 54 mg./hr. and was maintained for over 6 hr.; with a double membrane (2 discs) the rate was 26.5 mg./hr. and was maintained for over 12 hr. In each case the bacterial density increased at a constant rate proportional to the lactose feed rate.

EXAMPLE 3

Amino acid feed rates

Feed rates of various amino acids were determined by filling the capsule with the amino acid solution and immersing the capsule in water (250 ml.) contained in a one litre flask which was agitated on a rotary shaker. The following rates of amino acid efflux were observed over approximately 6 hr. period (the initial amino acid concentration in the capsule is given in brackets after the efflux rate); sodium glutamate, 0.28 mg./hr. (250 mg./100 ml.); arginine hydrochloride 0.57 mg./hr. (350 mg./100 ml.) and 0.90 mg./hr. (500 mg./100 ml.); valine, 0.30 mg./hr. (250 mg./hr.) and 0.59 mg./hr. (400 mg./100 ml.).

EXAMPLE 4

Glucose diffusion

The rates of diffusion of glucose from a capsule as used in Example 1 but with different initial glucose concentrations were measured using a 7-mm. diameter cellulose membrane. The rates were found to be constant for any one initial concentration over periods of 6 or more hours. With a 4-mm. diameter membrane the periods of constant diffusion were increased to ca. 12 hours but the rates of diffusion were decreased as shown in the following table.

| Initial concentration (percent) | Diffusion rate (mg./hr.) 7 mm. | Diffusion rate (mg./hr.), 4 mm. |
|---|---|---|
| 50 | 97.0 | 46.0 |
| 30 | | 16.67 |
| 12.5 | 19.0 | |
| 6.25 | 8.25 | |
| 3.13 | 4.0 | |

EXAMPLE 5

Lysine monohydrochloride diffusion

The rates of diffusion of a solution of lysine monohydrochloride (initially 5%) were measured using 1, 2, and 3 7-mm. diameter cellulose membranes in the cap. Constant diffusion was obtained for nearly 12 hours with one membrane and for over 24 hours with three. The rates of diffusion are set out below:

Layers of membrane:      Diffusion rate, mg./hr.

1 — 3.75
2 — 3.0
3 — 1.2

What is claimed is:

1. A container for providing a controlled supply of a required component to an aqueous chemical or biological system, comprising a rigid substantially impermeable hollow cylindrical capsule provided at one end with a circular aperture, said capsule further being provided with removable sealing means for sealing said aperture against an internal pressure of about 100 kg./cm.$^2$ with at least one disc of an imperforate dialysis membrane, said sealing means comprising:
   (1) an annular cap having an opening therethrough and having means for screw engagement with said cylindrical capsule;
   (2) an annular groove surrounding said aperture;
   (3) an O-ring resilient washer adapted to engage said annular groove; and
   (4) said dialysis membrane being sealingly held against said O-ring by said cap.

2. A container for providing at a substantially constant rate a supply of a required component to an aqueous chemical or biological system comprising a rigid substantially impermeable capsule provided with an internal chamber connected to a circular aperture in one end of said capsule by a narrow cylindrical bore, said capsule further being provided with removable sealing means for sealing said aperture against an internal pressure of about 100 kg./cm.$^2$ with at least one disc of an imperforate dialysis membrane, said sealing means comprising:
   (1) an apertured cap with means for screw engagement with said end of said capsule;
   (2) an O-ring resilient washer embedded in an annular groove surrounding said circular aperture in said end; and
   (3) said dialysis membrane being sealingly held against said O-ring by said cap.

3. A method of continuous, substantially constant addition of a component to an aqueous chemical or biological system undergoing a chemical reaction or biological process, whereby the added component is diffused into the system during the chemical reaction or biological process from a sealed container substantially full of an aqueous solution of said component, said container being a rigid substantially impermeable hollow cylindrical capsule provided at one end with a circular aperture, said capsule further being provided with removable sealing means for sealing said aperture against an internal pressure of about 100 kg./cm.$^2$ with at least one disc of an imperforate dialysis membrane, said sealing means comprising:
   (1) an annular cap having an opening therethrough and means for screw engagement with said cylindrical capsule;
   (2) an annular groove surrounding said aperture;
   (3) an O-ring resilient washer adapted to engage said annular groove, immersed in the system; and
   (4) said dialysis membrane being sealingly held against said O-ring by said cap.

4. A method of continuous, substantially constant addition of a component to an aqueous chemical or biological system undergoing a chemical reaction or biological system undergoing a chemical reaction or biological process, whereby the added component is diffused into the system during the chemical reaction or biological process from a sealed container substantially full of an aqueous solution of said component, said container being a rigid substantially impermeable capsule provided with an internal chamber connected to a circular aperture in one end of said capsule by a narrow cylindrical bore, said capsule further being provided with removable sealing means for sealing said aperture against an internal pressure of about 100 kg./cm.$^2$ with at least one disc of an imperforate dialysis membrane, said sealing means comprising:
   (1) an apertured cap with means for screw engagement with said end of said capsule;
   (2) an O-ring resilient washer embedded in an annular groove surrounding said circular aperture in said end, immersed in the system; and
   (3) said dialysis membrane being sealingly held against said O-ring by said cap.

References Cited

UNITED STATES PATENTS

| 3,301,769 | 1/1967 | Steel | 195—139 |
| 3,186,917 | 6/1965 | Gerhardt et al. | 195—1 |
| 2,734,015 | 2/1956 | Wettstein et al. | 195—115 |
| 3,545,927 | 12/1970 | Scott | 23—253 |
| 3,146,904 | 9/1964 | Hansen et al. | 99—171 ND |

A. LOUIS MONACELL, Primary Examiner

R. M. ELLIOTT, Assistant Examiner

U.S. Cl. X.R.

23—253; 195—127; 210—22, 321